(12) United States Patent
Marr

(10) Patent No.: US 8,711,184 B2
(45) Date of Patent: Apr. 29, 2014

(54) SCALABLE PIXEL COVERAGE FUNCTION-MAP

(75) Inventor: Gregory John Marr, Hillsborough (AU)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 12/762,773

(22) Filed: Apr. 19, 2010

(65) Prior Publication Data

US 2010/0271404 A1 Oct. 28, 2010

(30) Foreign Application Priority Data

Apr. 22, 2009 (AU) ................................. 2009201612

(51) Int. Cl.
*G09G 5/391* (2006.01)

(52) U.S. Cl.
USPC ............................. 345/667; 345/611; 345/613

(58) Field of Classification Search
None
See application file for complete search history.

(56) References Cited

U.S. PATENT DOCUMENTS

| | | | |
|---|---|---|---|
| 5,657,430 A | | 8/1997 | Smith et al. |
| 5,710,880 A | * | 1/1998 | Howlett et al. ............... 345/468 |
| 6,304,337 B1 | | 10/2001 | Love et al. |
| 6,437,793 B1 | * | 8/2002 | Kaasila ......................... 345/611 |
| 6,757,449 B1 | | 6/2004 | Loce |
| 2003/0095135 A1 | | 5/2003 | Kaasila et al. |

OTHER PUBLICATIONS

Examiner's first report of Australian Patent Application No. 2009201612, mailed Nov. 12, 2010.

* cited by examiner

*Primary Examiner* — Kee M Tung
*Assistant Examiner* — Sing-Wai Wu
(74) *Attorney, Agent, or Firm* — Fitzpatrick, Cella, Harper & Scinto

(57) ABSTRACT

A method of generating an image of a scalable graphical object for reproduction on a display device is disclosed. The method provides a pixel map and a scaling factor, the map being a representation of at least of portion of the image with each pixel of the map corresponding to a pixel of the image and having a corresponding pixel coverage representation. The method, for at least one pixel in the map, identifies the pixel coverage representation associated with the pixel, and determines a pixel coverage value for the pixel using the pixel coverage representation and the scaling factor. The method then renders the scalable graphical object using the determined pixel coverage value for the pixel on the display device.

13 Claims, 14 Drawing Sheets

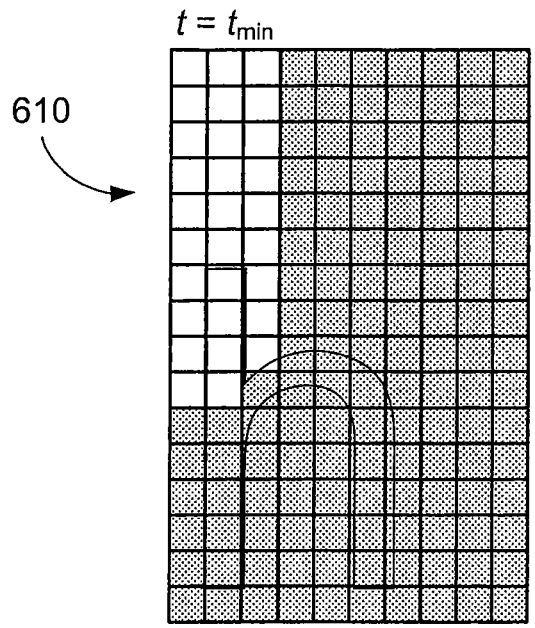
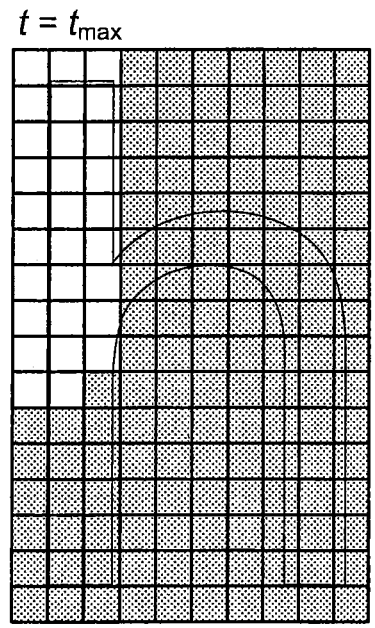
Figure 6A  Figure 6B
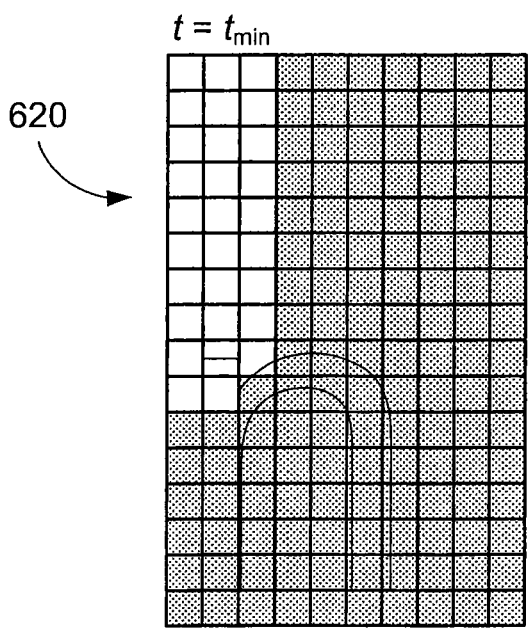
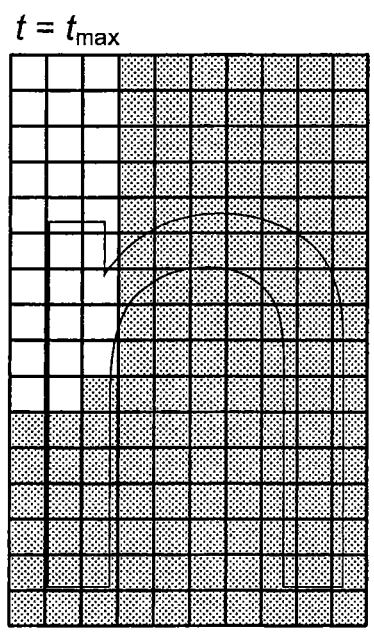
Figure 6C  Figure 6D

SCALABLE PIXEL COVERAGE FUNCTION-MAP

CROSS REFERENCE TO RELATED PATENT APPLICATION

This application claims the benefit under 35 U.S.C. §119 of the filing date of Australian Patent Application No. 2009201612, filed Apr. 22, 2009, hereby incorporated by reference in its entirety as if fully set forth herein.

TECHNICAL FIELD

The current invention relates to the field of computer graphics, and in particular, an improved method of shape representation and shape rendering that is suitable for low resolution display reproduction.

BACKGROUND

The representation and rendering of graphical objects is of fundamental importance in the field of computer graphics. Graphical objects can have many properties, including color, a compositing operator, a shape representation, and a geometric transformation. A renderer uses a shape representation, along with the geometric transformation, to determine the pixels covered by a graphical object. Furthermore, pixel coverage can be either bi-level or multileveled. In the bi-level case, each pixel is either covered or not covered by a particular graphical object. In the multileveled case, the area of the pixel covered by a graphical object is approximated, thereby allowing intermediate levels of pixel coverage. This is sometimes referred to as grayscale rendering, although it is important to note that the gray level represents pixel coverage, which is not the same as the color of the object.

The representation of an object's shape usually depends on the type of object, although it is possible to convert between different types of representations. For example, the shapes of objects used in vector graphics are usually described using paths, which are sets of lines and curves. The shapes of photographic images are usually defined by the rectangular region determined by the dimensions of the image. The shape of text objects, however, is considerably more complex than that of vector graphics or images. Text is often represented by a text string, a reference to a font and a geometric transformation. Generally, a font contains a collection of glyphs. The text string refers to a sequence of glyphs from the font by some means of encoding. Each glyph in the font contains a shape representation, and possibly some other information such as metrics and hinting information.

Whilst the following discussion focuses on glyph shape representations, the discussion still applies to the general topic of shape representations.

Bitmaps are perhaps the earliest form of glyph shape representation. Bitmaps are still quite heavily used for glyph representations at low resolutions, such as required for display devices used on hand-held devices including digital still cameras and digital video cameras. The attractiveness of bitmap glyphs at low resolutions is due to the low memory and low processing required by such bitmap-based glyphs. However, the quality of a bitmap-based shape representation degrades significantly if a geometric transformation, such as scaling, is required. This may be required if, for example, the digital camera is connected to large display (e.g. a home television display) and text such as menus and the like is required to be reproduced on the large display. If text reproduction is required at multiple point sizes, then a bitmap should be stored for each point size if the maximum quality is required. This has the disadvantage that an increased memory capacity is required to hold the additional glyph representations. Furthermore, animation that involves scaling text may exhibit aliasing.

Path-based glyph representation attempts to overcome the transformation limitations of bitmap-based glyph representations. Path-based glyph representations are found in the Type 1 (Adobe Systems Inc) and TrueType (Apple Computer Inc) font formats. Glyph shapes are described by a set of straight lines and Bezier curves. Both formats define font filling and pixel placement rules, which allows an outline to be converted into bi-level bitmaps. Various techniques exist that allow multilevel bitmap generation, such as super-sampling. However, super-sampling has the disadvantage of requiring significantly more processing time. The increased processing time is unsuitable for the real-time rendering required for text animation.

Another method of generating a multilevel bitmap of a shape involves storing a high-resolution bi-level bitmap. Each pixel in the lower resolution multilevel bitmap is determined by averaging a corresponding rectangular region in the high resolution bi-level bitmap. This method has the disadvantage of significant computational costs per pixel.

SUMMARY

It is an object of the present invention to substantially overcome, or at least ameliorate, one or more disadvantages of existing arrangements.

Disclosed are arrangements which seek to address the above problems by providing improved methods and systems of shape representation and shape rendering, particularly methods and systems suitable for providing and rendering shape representations for low resolution display applications.

According to one aspect of the present disclosure there is provided a method of generating an image of a scalable graphical object for reproduction on a display device, the method comprising the steps of:

providing a pixel map and a scaling factor, the map being a representation of at least of portion of the image with each pixel of the map corresponding to a pixel of the image and having a corresponding pixel coverage representation;

for at least one pixel in the map:

identifying the pixel coverage representation associated with the pixel, and determining a pixel coverage value for the pixel using the pixel coverage representation and the scaling factor; and rendering the scalable graphical object using the determined pixel coverage value for the pixel on the display device.

Preferably, the identifying is independent of the scaling factor. Desirably at least one of the pixel coverage representations is referenced by a plurality of pixel locations in the pixel map. The pixel map and the corresponding pixel coverage representations may be associated with the scalable graphical object. Typically, the scalable graphical object is a glyph. Advantageously, the pixel coverage representations are shared between a plurality of pixel coverage function maps associated with a font comprising a plurality of glyphs, wherein each of the pixel maps being associated with a selected glyph of the plurality of glyphs.

According to another aspect of the present disclosure, there is provided a method of reproducing a glyph from a font on a display of a portable electronic device, the method being performed by a processor if the electronic device and comprising the steps of:

(a) providing a pixel map of the glyph and a scaling factor, with each pixel of the map corresponding to a pixel of the display and having a corresponding pixel coverage representation; and (b) for at least one pixel in the map:
       (ba) identifying the pixel coverage representation associated with the pixel, and
       (bb) determining a pixel coverage value for the pixel using the pixel coverage representation and the scaling factor; and
       (bc) rendering the pixel of the glyph using the determined pixel coverage value for the pixel on the display device.

Preferably the glyph is scalable within a boundary of the pixel map according to the scaling factor such that a pixel location of an origin of the glyph within the pixel map remains constant for all scaling factors associated with the pixel map. Desirably steps (bb) and (bc) are not performed for a pixel of the map having a null pixel coverage representation. Advantageously, the identifying is independent of the scaling factor and at least one of the pixel coverage representations is referenced by a plurality of pixel locations in the pixel map.

Other aspects of the invention are also disclosed.

BRIEF DESCRIPTION OF THE DRAWINGS

At least one embodiment of the present invention will now be described with reference to the following drawings, in which:

FIGS. 6A to 6D illustrate common pixel coverage function areas for two example shapes;

DETAILED DESCRIPTION INCLUDING BEST MODE

Figure 1A:
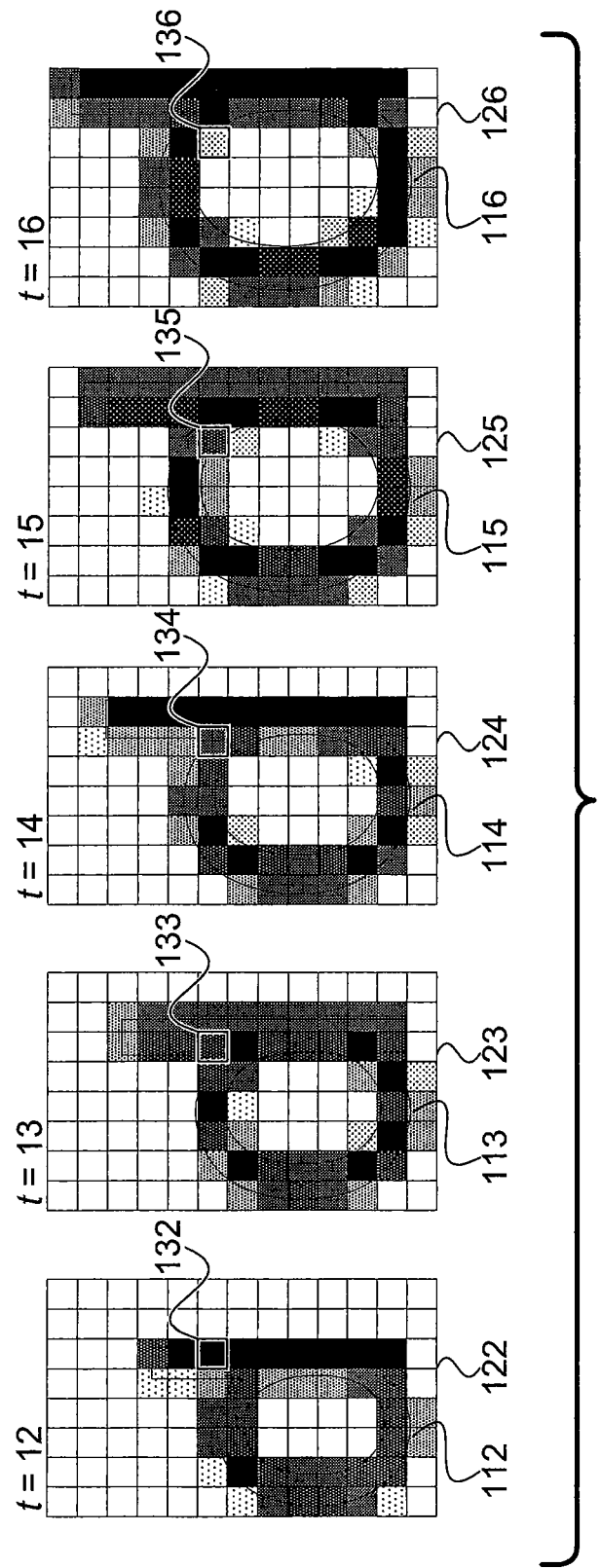
FIG. 1A shows a sequence of diagrams that illustrate the letter 'd' in Helvetica typeface, rendered with increasing scaling factors (t=12, t=13, t=14, t=15, t=16)

Where reference is made in any one or more of the accompanying drawings to steps and/or features, which have the same reference numerals, those steps and/or features have for the purposes of this description the same function(s) or operation(s), unless the contrary intention appears.

Disclosed herein is a method 400 of generating an image of a scalable graphical object, in particular the shape of a graphical object, over a predetermined range of scaling factors [$t_{min}$, $t_{max}$], and rendering of the graphical object with a plurality of pixels to display the object on a display device. The method comprises providing a pixel coverage representation map, herein referred to as a "pixel map", and a scaling factor. The map is a representation of at least a portion of the image, such as an 8×12 matrix of pixels, with each pixel of the map corresponding to a pixel of the image to be rendered and displayed by the display device. Each pixel of the map has an associated pixel coverage function which, via a corresponding pixel coverage representation, is adapted for determining a pixel coverage value over the range of scaling factors [$t_{min}$, $t_{max}$] for the pixel. Each of the plurality of pixel coverage functions associated with the object represents the coverage (which may, for example be associated with a grayscale value for rendering of the pixel) of an individual pixel used to render the object for a given scaling factor t. The method, preferably for each pixel in the map, identifies a pixel coverage representation associated with the pixel. This identification is performed independent of the scaling factor, since the pixel coverage function corresponding to the identified representation is associated with the pixel coordinate in the map, not the scale factor that may be applied to the map. The map and its associated functions/representations exist independent of the scaling factor.

The method then determines a pixel coverage value, desirably for each pixel in the map using the pixel coverage representation and the scaling factor. This represents the coverage of the pixel at the particular scaling factor. An image of the scalable graphical object is then rendered to the display device using the determined pixel coverage value. The rendering may utilize other operations, such as compositing and priority to name but a few, to output the correct displayable pixel value.

The collection of the plurality of pixel coverage functions associated with the object may be considered as forming a pixel map for the object, which can be evaluated as a function of scaling factor, or alternatively font size where the object is a glyph (i.e. of a font) for a particular typeface. This pixel map may be referred to as a shape representation for the graphical object. It will be appreciated that reference to a grayscale value herein refers to a grayscale representation of the object, however the present methods are not limited to grayscale representations and instead the grayscale value may refer mutatis mutandis to one or more of color, luminosity, saturation or hue as appropriate for a color representation of the object, or as an opacity mask for a different object. For example, the present methods may be used to mask an image or a tiled pattern.

Figure 9A:
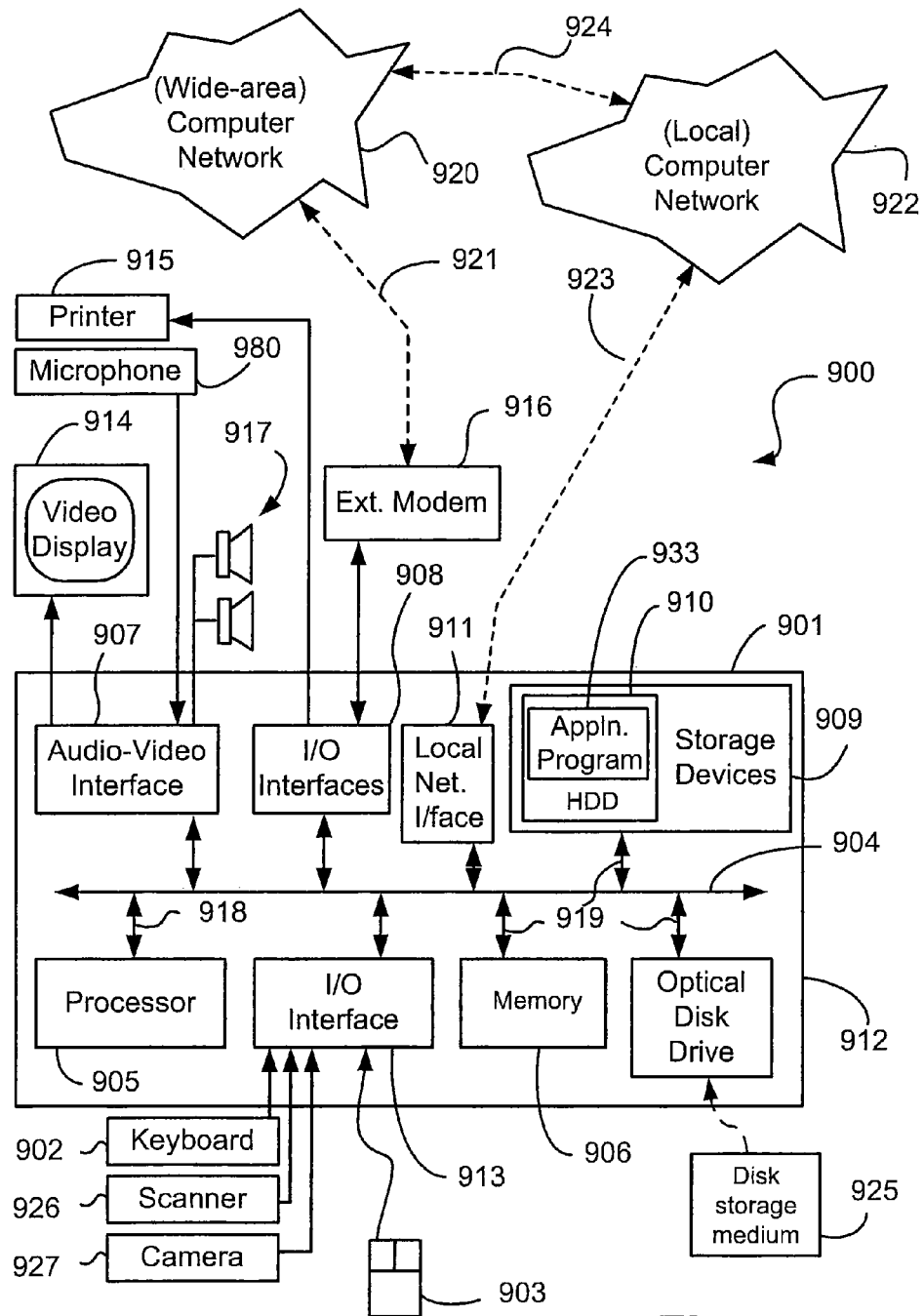
FIG. 9A is a schematic block diagram of a general purpose computer system upon which the arrangements described can be practiced.
Figure 9B:
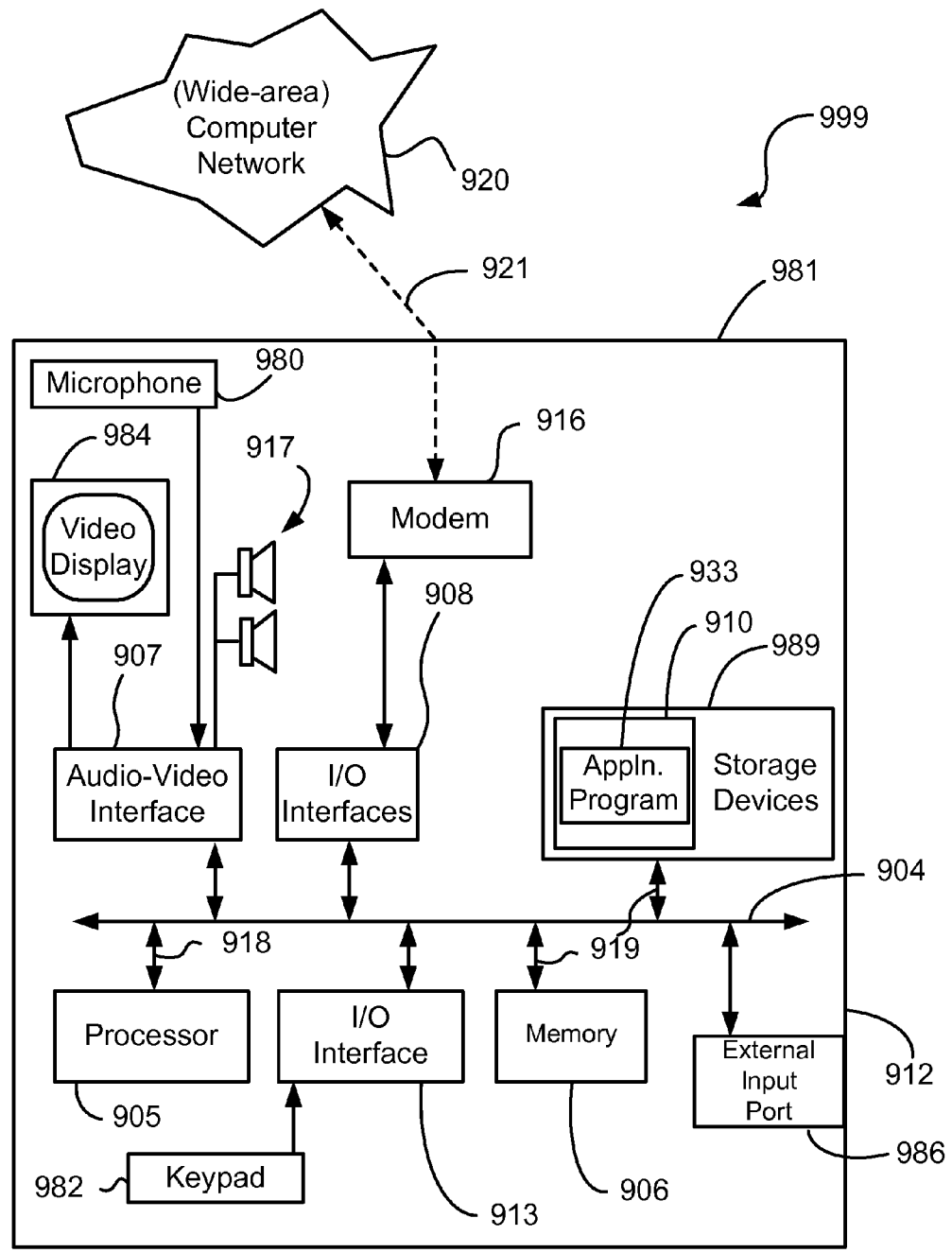
FIG. 9B is a schematic block diagram of a handheld or thin-client computing system upon which the arrangements described can be practiced.
Figure 9C:
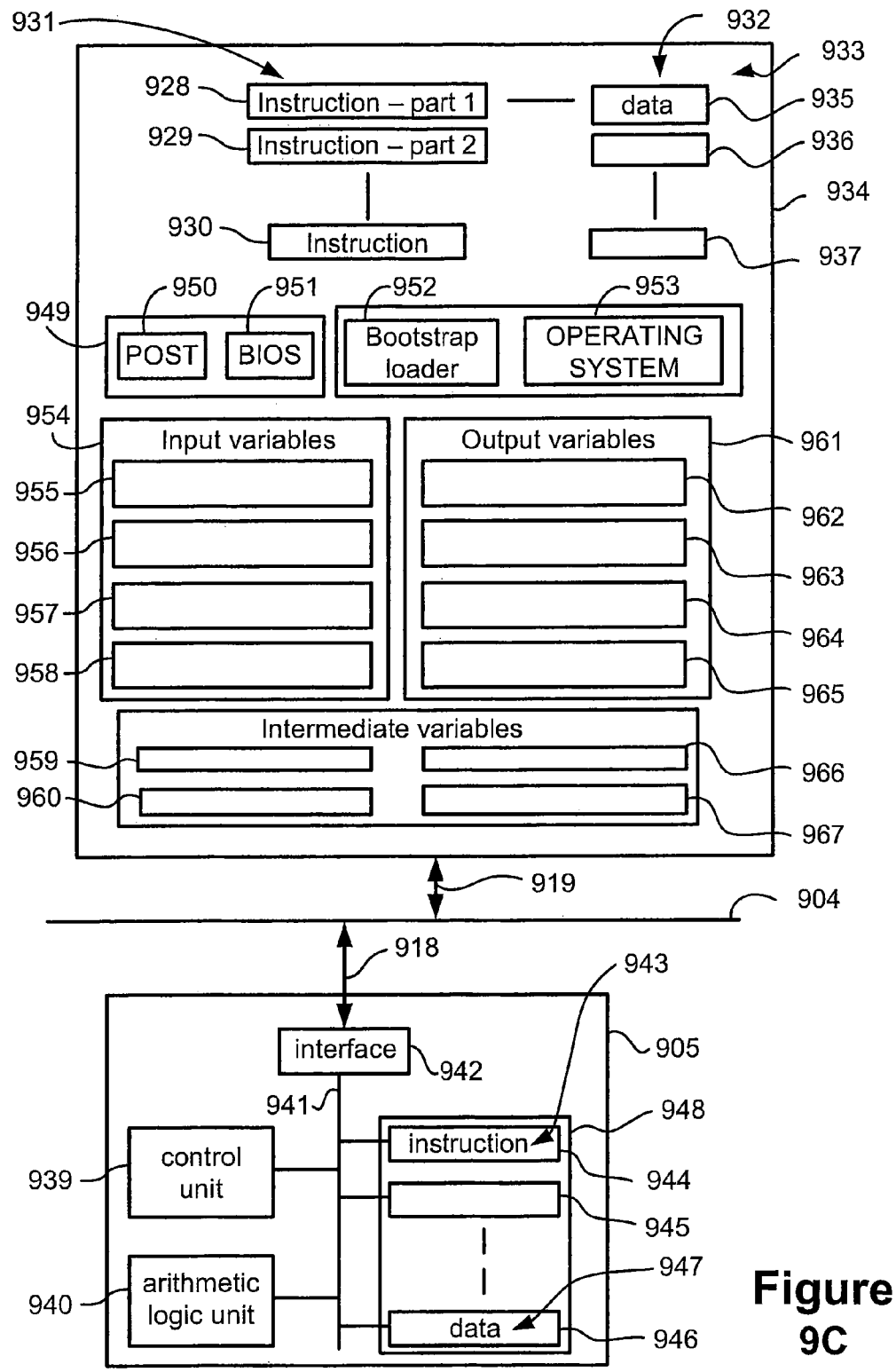
FIG. 9C is a schematic block diagram of a processor and memory system for use in either the general purpose computer system, handheld or thin-client computing system of FIGS. 9A and 9B.

FIG. 9A is a schematic block diagram of a general purpose computer system 900. FIG. 9B is a schematic block diagram of a (portable) handheld or thin-client computing system 999, often characterised by the use of embedded devices of limited processing capacity and speed, and limited memory, in comparison to the general-purpose arrangement of FIG. 9A. The methods disclosed herein may be practiced on either apparatus 900 or 999 as required. FIG. 9C is a schematic block diagram of a processor and memory system for use in either the general purpose computer system 900 or thin-client system 999. The thin-client system 999 may be implemented as a hand-held device, for example, a personal digital assistant, mobile phone, digital audio playback device, digital still camera, digital video camera, or may be a peripheral computing device for example a printer, scanner, or the like.

As seen in FIGS. 9A and 9B respectively showing a general purpose computer system 900 and a thin-client system 999, the computer systems 900 or 999 may be formed by components comprising one or more of a computer module 901 or 981, input devices such as a keyboard 902 or keypad 982 (of FIGS. 9A and 9B respectively), a mouse pointer device 903, a scanner 926, a camera 927, and a microphone 980, and output devices including a printer 915, a display device 914 or 984 (of FIGS. 9A and 9B respectively) and loudspeakers 917 as shown, where like reference numerals refer to components with like functionality. Video display device 984 of the thin-client system 999 in FIG. 9B may be a low resolution video display device. Thin-client system 999 may also comprise an input port 986 adapted to accept an external connection to the thin-client system. An external Modulator-Demodulator (Modem) transceiver device 916 may be used by the computer module 901 or 981 for communicating to and from a communications network 920 via a connection 921. The network 920 may be a wide-area network (WAN), such as the Internet or a private WAN. Where the connection 921 is a telephone line, the modem 916 may be a traditional "dial-up" modem. Alternatively, where the connection 921 is a high capacity (eg: cable) connection, the modem 916 may be a broadband modem. A wireless modem may also be used for wireless connection to the network 920.

The computer module 901 or 981 typically includes at least one processor unit 905, and a memory unit 906 for example formed from semiconductor random access memory (RAM) and semiconductor read only memory (ROM). The module 901 or 981 also includes an number of input/output (I/O) interfaces including an audio-video interface 907 that couples to the video display 914, loudspeakers 917 and microphone 980, an I/O interface 913 for the keyboard 902, mouse 903, scanner 926, camera 927 and optionally a joystick (not illustrated), and an interface 908 for the external modem 916 and printer 915. In some implementations, the modem 916 may be incorporated within the computer module 901 or 981, for example within the interface 908. The computer module 901 or 981 also has a local network interface 911 which, via a connection 923, permits coupling of the computer system 900 or 999 to a local computer network 922, known as a Local Area Network (LAN). As also illustrated, the local network 922 may also couple to the wide network 920 via a connection 924, which would typically include a so-called "firewall" device or device of similar functionality. The interface 911 may be formed by an Ethernet circuit card, a Bluetooth™ wireless arrangement or an IEEE 802.11 wireless arrangement.

The interfaces 908 and 913 may afford either or both of serial and parallel connectivity, the former typically being implemented according to the Universal Serial Bus (USB) standards and having corresponding USB connectors (not illustrated). Storage devices 909 or 989 are provided. Storage device 909 typically includes a hard disk drive (HDD) 910. Storage device 989, may or may not comprise a HDD, or may comprise other storage means, for example, solid state storage memory, and may also or alternately comprise removable storage devices or memory. Storage device 989 may in some arrangements comprise memory 909. Other storage devices such as a floppy disk drive and a magnetic tape drive (not illustrated) may also be used. An optical disk drive 912 is typically provided to act as a non-volatile source of data. Portable memory devices, such optical disks (eg: CD-ROM, DVD), USB-RAM, and floppy disks for example may then be used as appropriate sources of data to the system 900 or 999.

The components 905 to 913 of the computer module 901 or 981 typically communicate via an interconnected bus 904 and in a manner which results in a conventional mode of operation of the computer systems 900 or 999 known to those in the relevant art. Examples of computers 901 on which the described arrangements can be practised include IBM-PC's and compatibles, Sun Sparcstations, Apple Mac or alike computer systems evolved therefrom.

The method 400 of generating an image of a scalable graphical object may be implemented using the computer systems 900 or 999 wherein the processes of FIGS. 2 to 8, to be described, may be implemented as one or more software application programs 933 executable within the computer systems 900 or 999. In particular, the steps of the method 400 are effected by instructions 931 in the software 933 that are carried out within the computer systems 900 or 999. The software instructions 931 may be formed as one or more code modules, each for performing one or more particular tasks. The software may also be divided into two separate parts, in which a first part and the corresponding code modules performs the representation methods and a second part and the corresponding code modules manage a user interface between the first part and the user.

The software 933 is generally loaded into the computer systems 900 or 999 from a computer readable medium, and is then typically stored in the HDD 910, as illustrated in FIG. 9A, or the memory 906, after which the software 933 can be executed by the computer systems 900 or 999. In some instances, the application programs 933 may be supplied to the user encoded on one or more CD-ROM 925 and read via the corresponding drive 912 prior to storage in the memory 910 or 906. Alternatively the software 933 may be read by the computer systems 900 or 999 from the networks 920 or 922 or loaded into the computer systems 900 or 999 from other computer readable media. Computer readable storage media refers to any storage medium that participates in providing instructions and/or data to the computer systems 900 or 999 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 901 or 981. Examples of computer readable transmission media that may also participate in the provision of software, application programs, instructions and/or data to the computer module 901 or 981 include radio or infra-red transmission channels as well as a network connection to another computer or networked device, and the Internet or Intranets including e-mail transmissions and information recorded on Websites and the like.

The second part of the application programs 933 and the corresponding code modules mentioned above may be executed to implement one or more graphical user interfaces (GUIs) to be rendered or otherwise represented upon the display 914. Through manipulation of typically the keyboard 902 and the mouse 903, a user of the computer systems 900 or 999 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 917 and user voice commands input via the microphone 980.

FIG. 9C is a detailed schematic block diagram of the processor 905 and a "memory" 934. The memory 934 represents a logical aggregation of all the memory devices (including the HDD 910 and semiconductor memory 906) that can be accessed by the computer module 901 in FIG. 9A or 981 in FIG. 9B.

When the computer module 901 or 981 is initially powered up, a power-on self-test (POST) program 950 executes. The POST program 950 is typically stored in a ROM 949 of the semiconductor memory 906. A program permanently stored in a hardware device such as the ROM 949 is sometimes referred to as firmware. The POST program 950 examines hardware within the computer module 901 or 981 to ensure proper functioning, and typically checks the processor 905, the memory (909, 906, 989), and a basic input-output systems software (BIOS) module 951, also typically stored in the ROM 949, for correct operation. Once the POST program 950 has run successfully, the BIOS 951 activates the hard disk drive 910. Activation of the hard disk drive 910 causes a bootstrap loader program 952 that is resident on the hard disk drive 910 to execute via the processor 905. This loads an operating system 953 into the RAM memory 906 upon which the operating system 953 commences operation. The operating system 953 is a system level application, executable by the processor 905, to fulfil various high level functions, including processor management, memory management, device management, storage management, software application interface, and generic user interface.

The operating system 953 manages the memory (909, 906, 989) in order to ensure that each process or application running on the computer module 901 or 981 has sufficient memory in which to execute without colliding with memory allocated to another process. Furthermore, the different types of memory available in the systems 900 or 999 must be used properly so that each process can run effectively. Accordingly, the aggregated memory 934 is not intended to illustrate how particular segments of memory are allocated (unless otherwise stated), but rather to provide a general view of the memory accessible by the computer systems 900 or 999 and how such is used.

The processor 905 includes a number of functional modules including a control unit 939, an arithmetic logic unit (ALU) 940, and a local or internal memory 948, sometimes called a cache memory. The cache memory 948 typically includes a number of storage registers 944-946 in a register section. One or more internal buses 941 functionally interconnect these functional modules. The processor 905 typically also has one or more interfaces 942 for communicating with external devices via the system bus 904, using a connection 918.

The application program 933 includes a sequence of instructions 931 that may include conditional branch and loop instructions. The program 933 may also include data 932 which is used in execution of the program 933. The instructions 931 and the data 932 are stored in memory locations 928-930 and 935-937 respectively. Depending upon the relative size of the instructions 931 and the memory locations 928-930, a particular instruction may be stored in a single memory location as depicted by the instruction shown in the memory location 930. Alternately, an instruction may be segmented into a number of parts each of which is stored in a separate memory location, as depicted by the instruction segments shown in the memory locations 928-929.

In general, the processor 905 is given a set of instructions which are executed therein. The processor 905 then waits for a subsequent input, to which it reacts to by executing another set of instructions. Each input may be provided from one or more of a number of sources, including data generated by one or more of the input devices 902, 903, data received from an external source across one of the networks 920, 922, data retrieved from one of the storage devices 906, 909, 989 or data retrieved from a storage medium 925 inserted into the corresponding reader 912. The execution of a set of the instructions may in some cases result in output of data. Execution may also involve storing data or variables to the memory 934.

The disclosed methods use input variables 954 that are stored in the memory 934 in corresponding memory locations 955-958. The disclosed methods produce output variables 961 that are stored in the memory 934 in corresponding memory locations 962-965. Intermediate variables may be stored in memory locations 959, 960, 966 and 967.

The register section 944-946, the arithmetic logic unit (ALU) 940, and the control unit 939 of the processor 905 work together to perform sequences of micro-operations needed to perform "fetch, decode, and execute" cycles for every instruction in the instruction set making up the program 933. Each fetch, decode, and execute cycle comprises:

(a) a fetch operation, which fetches or reads an instruction 931 from a memory location 928;

(b) a decode operation in which the control unit 939 determines which instruction has been fetched; and (c) an execute operation in which the control unit 939 and/or the ALU 940 execute the instruction.

Thereafter, a further fetch, decode, and execute cycle for the next instruction may be executed. Similarly, a store cycle may be performed by which the control unit 939 stores or writes a value to a memory location 932.

Each step or sub-process in the processes of FIGS. 2 to 8 is associated with one or more segments of the program 933, and is performed by the register section 944-947, the ALU 940, and the control unit 939 in the processor 905 working together to perform the fetch, decode, and execute cycles for every instruction in the instruction set for the noted segments of the program 933.

The method of generating an image of a scalable graphical object may alternatively be implemented in dedicated hardware such as one or more integrated circuits performing the functions or sub functions of the method 400, including storage and processing of the map and coverage representations to be described. Such dedicated hardware may include graphic processors, digital signal processors, or one or more microprocessors and associated memories.

Informally, the pixel coverage function at each pixel location in a raster image is expressed as a function of a scaling factor t. For example, a pixel coverage function may apply for a range of font sizes between, say, 12 pt and 16 pt, those sizes establishing a range of scaling factors for a font object. For example, FIG. 1A shows a sequence of diagrams depicting the outline of the shape of a letter 'd' in the Helvetica typeface at various scaling factors i.e. t=12 (112), t=13 (113), t=14 (114), t=15 (115), t=16 (116), each of which is superimposed on a 8×13 pixel grid or map (122, 123, 124, 125, and 126 respectively) at 72 dots per inch (dpi), corresponding to a typical video display device (914, 984), such as an LCD or plasma panel. To illustrate the function of each of the individual pixel coverage functions, consider for example the pixel 132 at location (5, 7) of the map 122 of FIG. 1A. When t=12, approximately 94% of the area inside the pixel (5, 7) 132 is contained inside the shape outline of the font glyph 112. When t=13, approximately 72% of the area inside the pixel (5, 7) 133 is contained inside the shape. When t=14, approximately 85% of the area inside the pixel (5, 7) 134 is contained inside the shape. When t=15, approximately 80% of the area inside the pixel (5, 7) 135 is contained inside the shape. When t=16, approximately 16% of the area inside the pixel (5, 7) 136 is contained inside the shape. These points are shown on a graph 110 of FIG. 1B by the points 142-146. Whilst in this example the pixel coverage of pixel 132 at location (5, 7) is established for integer values of t, the scaling factor can be any real number in the range [$t_{min}$, $t_{max}$]. More generally, the pixel coverage of pixel 132 at location (5, 7) can be expressed mathematically as the function:

$$P_{5,7}(t) = \iint_{\substack{5<x'<6 \\ 7<y'<8}} S\left(\frac{x'}{t}, \frac{y'}{t}\right) dx' dy', \quad (1)$$

where $S: R^2 \to \{0, 1\}$ such that $S(x, y) = \begin{cases} 0, & \text{outside the shape} \\ 1, & \text{inside the shape} \end{cases}$, as shown on the graph 110 by the continuous line 150.

By generalizing the above description for all pixels, a scalable pixel map can be formally expressed as a set of functions for all pixels $P_{x,y}: R \to R$ such that, for any given integer pixel coordinates (x, y) and scaling factor t, the value of the pixel coverage function $P_{x,y}(t)$ may be expressed as:

$$P_{x,y}(t) = \iint_{\substack{x<x'<x+1 \\ y<y'<y+1}} S\left(\frac{x'}{t}, \frac{y'}{t}\right) dx' dy'. \quad (2)$$

Figure 1B:
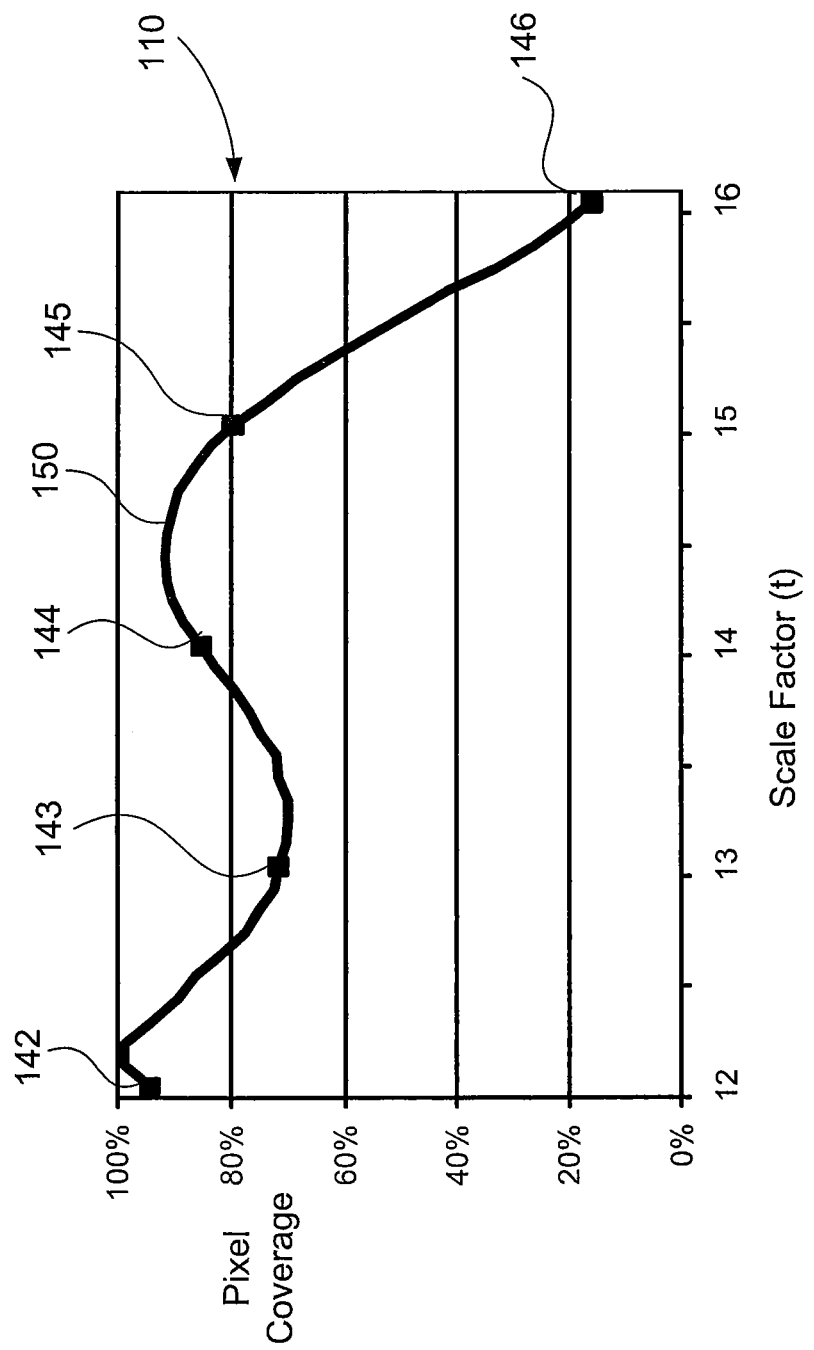
FIG. 1B is a graph of a pixel coverage function for a selected pixel in the letter 'd' as seen in FIG. 1A at scale factors corresponding to 12 pt≤t≤16 pt.
Figure 1C:
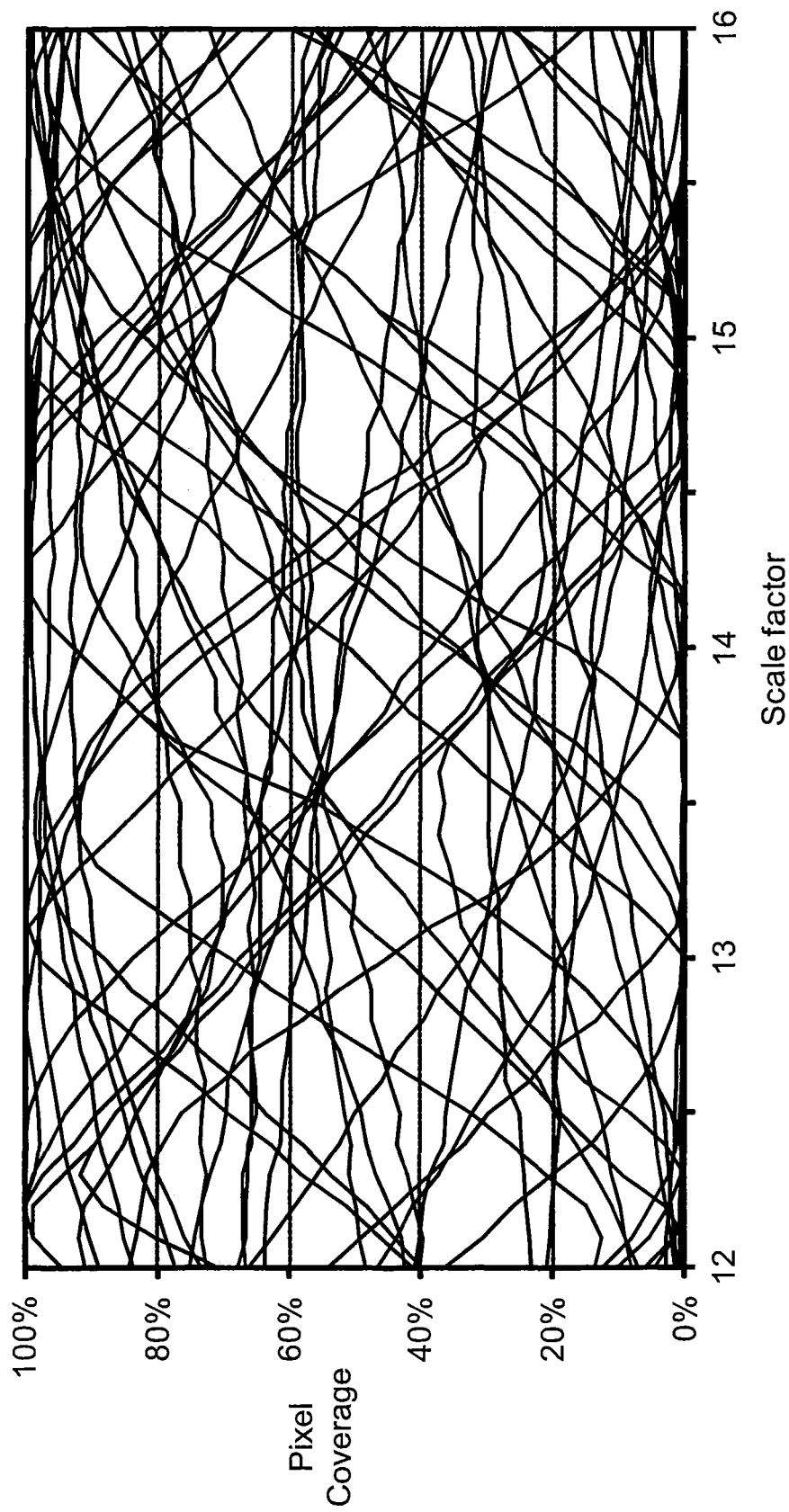
FIG. 1C is a graph of the pixel coverage functions for all pixels in the letter 'd' as seen in FIG. 1A at scale factors corresponding to 12 pt≤t≤16 pt.

FIG. 1C shows an example of a graph of the pixel coverage functions for all pixel locations in the 8×13 map for the letter 'd' in Helvetica typeface, where each line of the graph represents the pixel coverage for a single pixel, at scale factors corresponding to 12 pt≤t≤16 pt (at 72 dpi). As will be apparent from Equation (2), the pixel coverage function is continuous between the established bounds.

Figure 3A:
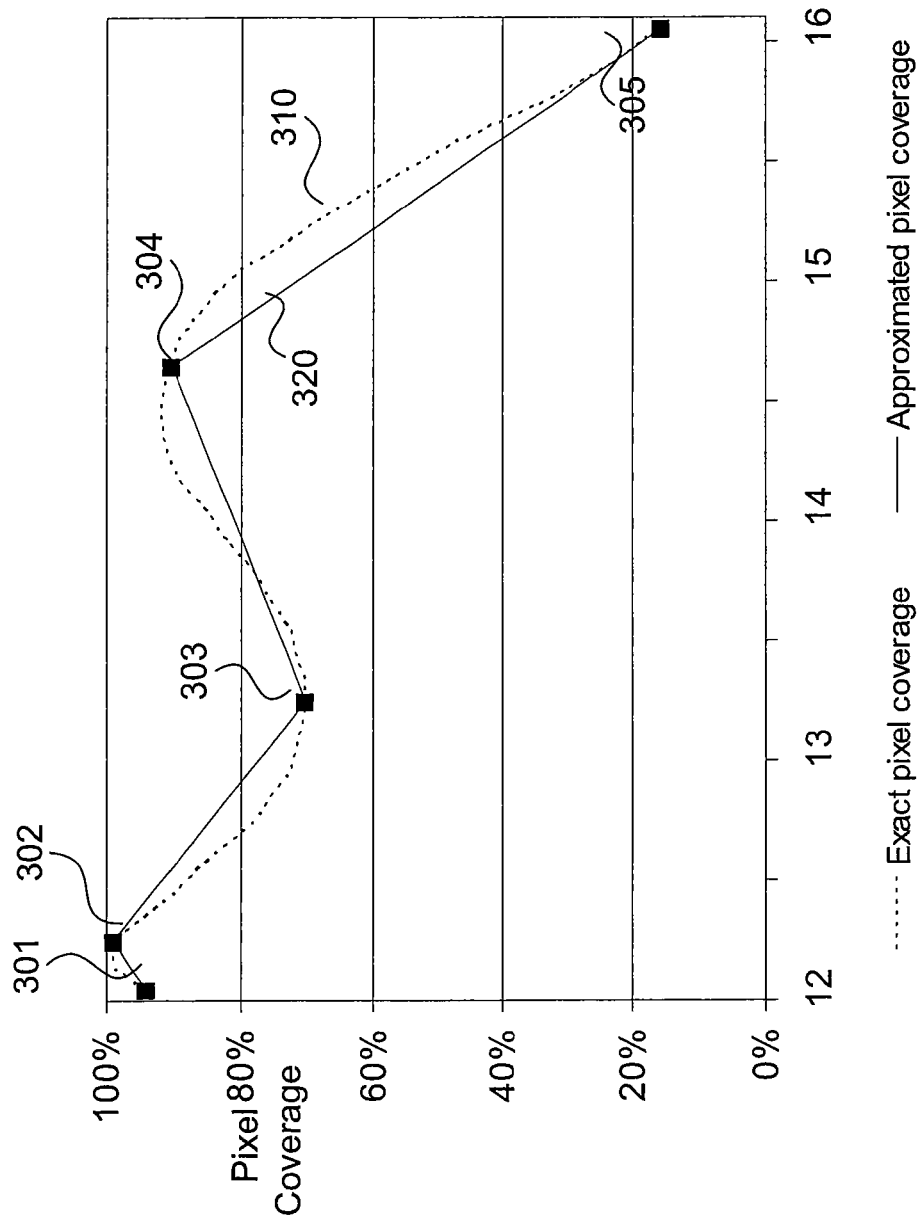
FIG. 3A is an example of a pixel coverage representation for the pixel coverage function of FIG. 1B.
Figure 3B:
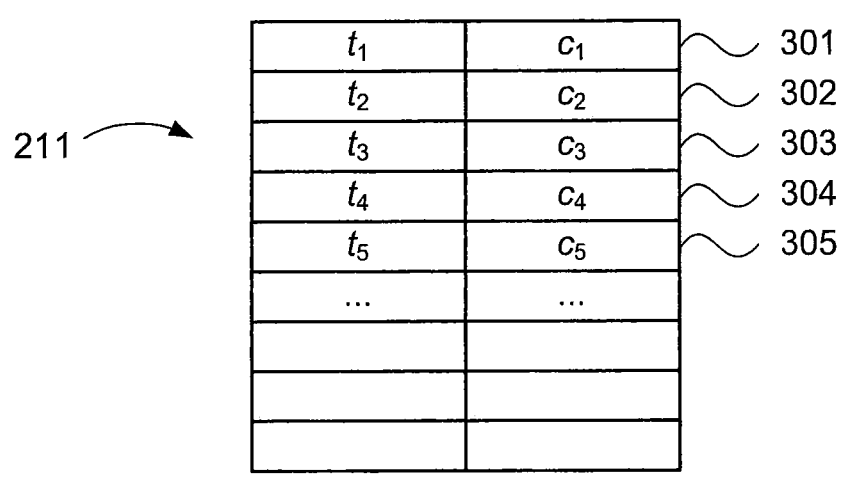
FIG. 3B is a memory layout of the pixel coverage representation shown in FIG. 3A, as used by the memory layout shown in FIG. 2.

FIG. 3A shows a graph of the exact pixel coverage function 310 in dotted line obtained from Equation 1 above and corresponding to that of FIG. 1B. In this example however, a piece-wise continuous linear function 320 is used to approximate the exact pixel coverage function 310 between the same scale boundaries. The use of such a piece-wise linear function is beneficial for reducing the memory size requirements for storing a useful approximation of the pixel coverage functions 310 in the memory 906. The piece-wise linear function 320 is defined by a sequence of points 301-305. The points 301-305 can be stored as a pixel coverage representation 211 in an array as pairs of scaling factors $t_n$ and pixel coverage values $c_n$, as shown in FIG. 3B. The pixel coverage representation 211 describes a useful approximation of the pixel coverage function 310. Further, dependent upon the font, map size and other factors, multiple pixel coverage representations may be predetermined for use in rendering operations in the systems 900 and 999. In this embodiment the pixel coverage representation is a piece-wise linear function, however any mathematical function could be used. For example, polynomials or trigonometric functions can be used to improve the accuracy or reduce the memory required. The optimal choice of mathematical function is highly dependent on the shape of the object.

A scalable pixel map comprises a means for associating pixel locations in the map and selected pixel coverage representations describing the coverage at a specific location in the map as a function of scaling factor associated with an object or glyph which may be subjected to scaling during rendering. In particular implementations, the scalable pixel map may be used as a means for generating a multilevel bitmap of a glyph. A scalable pixel map, as shown in FIG. 2 and FIG. 3B, and as described below, may be embodied in a computer system, for example the computer systems 900 or 999 as previously described.

Figure 2:
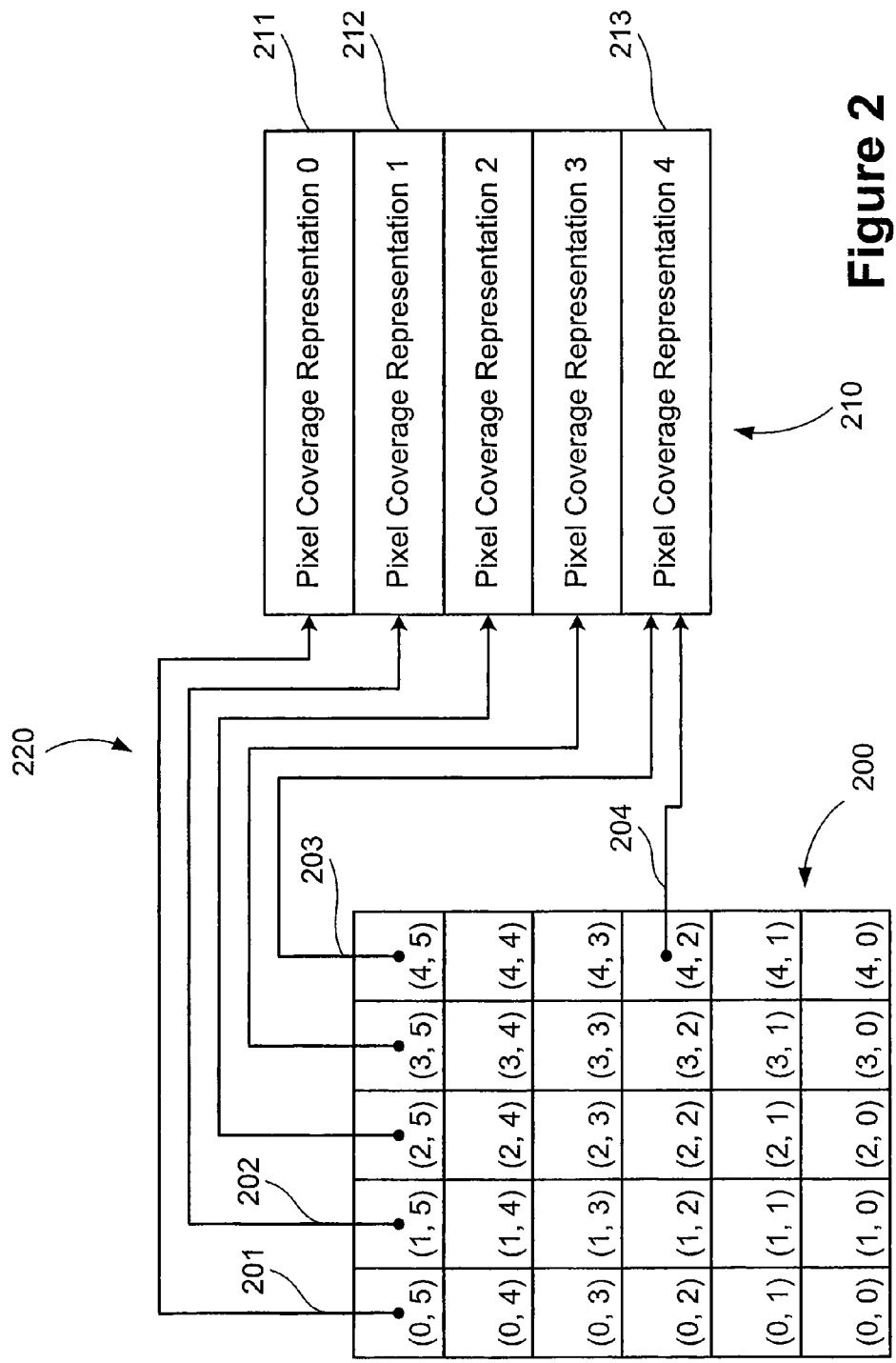
FIG. 2 is a diagram of a memory layout of a scalable pixel map, as used by the method of FIG. 4.

FIG. 2 shows a two-dimensional array 200 of references to pixel coverage representations 210. The two-dimensional array 200 is usually loaded into memory 906 from a storage device 909, or stored in ROM. Each node in the two-dimensional array 200 corresponds to a pixel location, at the same resolution, on the display 914. The two-dimensional array 200 is used to encode the shape of the object according to the methods disclosed herein. Accordingly, the resulting pixel values must be translated before rendering to the display 914 so that the object is positioned as intended. For example, the reference shown at 201 corresponds to pixel location (0, 5) within the two-dimensional array 200. The individual function references in the pixel map 220 refer to and thereby identify a pixel coverage representation selected from a plurality of such representations stored in a separate memory location 210 in memory 906. For example, pixel (0, 5) contains a reference 201 to pixel-coverage-representation-0 211, and pixel (1, 5) contains a reference 202 to pixel-coverage-representation-1 212. Many representation references have been omitted in FIG. 2 for the sake of clarity.

In some implementations, one or more pixel coverage representations may be shared between multiple pixel locations. For example, as shown in FIG. 2, the array entries that correspond to pixel locations (4, 5) and (4, 2) contain function references (203 and 204 respectively) to the same pixel coverage representation 213.

Further, those pixel locations that have a pixel coverage value of zero for all scaling factors in the pre-determined range of scaling factors [$t_{min}$, $t_{max}$] do not require a pixel coverage function. Where a pixel location does not have a coverage function, the corresponding pixel coverage representation may be a NULL value (not shown in the drawings). Typically, most pixel locations in the two-dimensional array 200 contain a reference to a pixel coverage representation. However, where the pixel value does not change as a function of the scaling factor, the pixel may be associated with a scalar value (for example zero if the pixel coverage value is zero for all values of t).

Figure 4:
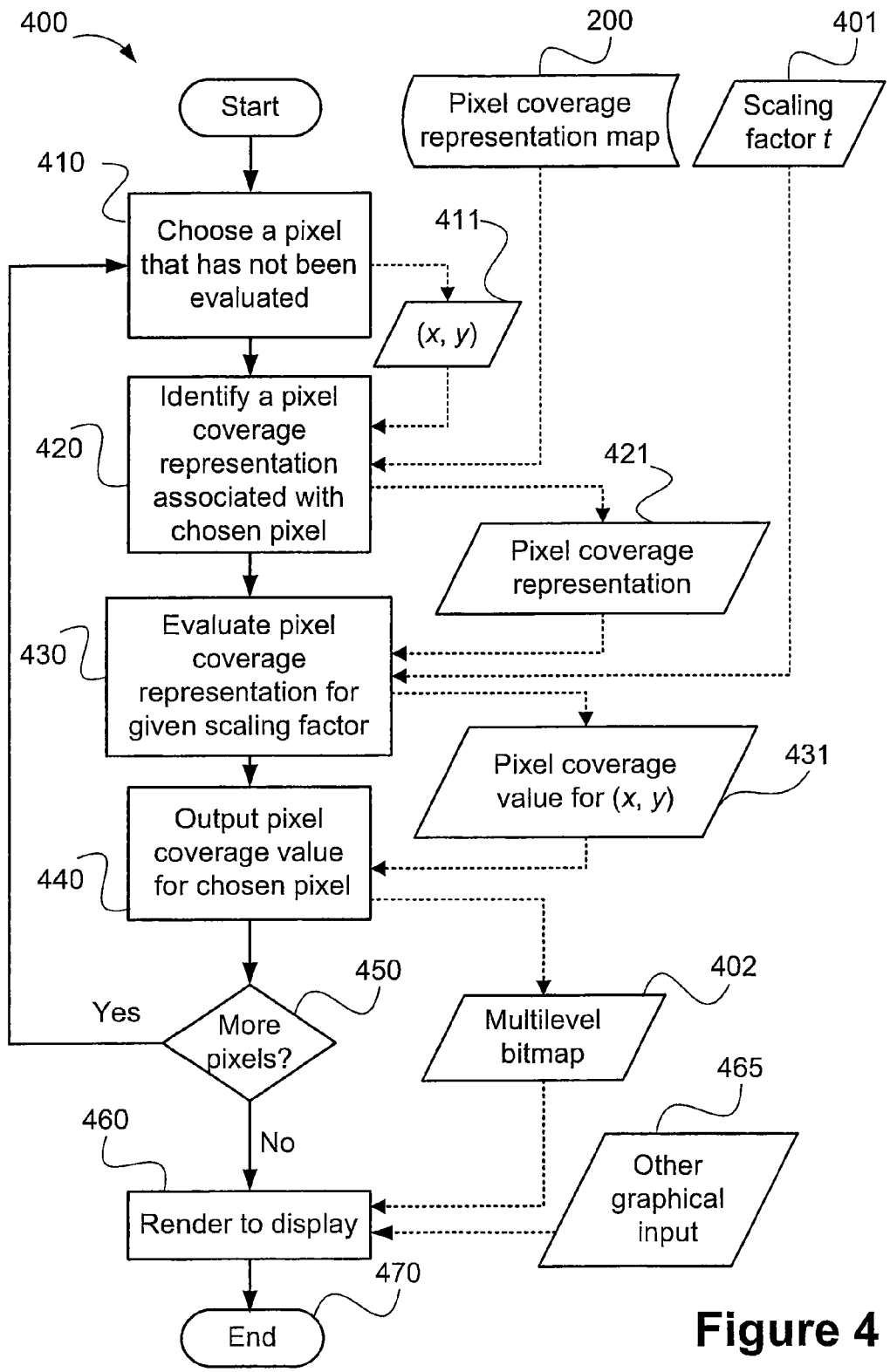
FIG. 4 is a schematic flow diagram of a method of determining the pixel coverage for a pixel for the rendering of a scalable graphical object.

FIG. 4 shows a method 400 used to generate a multilevel bitmap 402 from a provided scalable pixel map 200 and a provided scaling factor t 401. The method 400 is executed by the processor 905 and in a first step 410 the processor 905 determines a pixel co-ordinate that has not been evaluated or otherwise determined. Since step 410 is repeated for all pixels, the pixels are typically chosen in an order that matches the memory layout of the pixel map 200 stored in memory 906. The order may for example be a raster scan order. The inputs to the second step 420 are the scalable pixel map 200 and the pixel co-ordinate (x, y) 411 as determined in the first step 410.

In step 420, the processor 905 identifies the pixel coverage representation 421 associated with the given pixel location (x, y) 411 in the bitmap from the pixel map 200. As an example, suppose the pixel map 200 as shown in FIG. 2 is provided, along with the determined pixel location (0, 5), then the second step 420 would return pixel coverage function 0 211 associated and identified with pixel location (0, 5) by the function reference 201.

Step 430 takes as inputs the pixel coverage representation 421 as provided by step 420, and the required scaling factor t

401. In step 430, the pixel coverage value 431 is evaluated or otherwise determined by the processor 905 using the pixel coverage representation 421 for the provided scaling factor 401. With reference to FIG. 3, step 430 first determines a pair of scaling factors $t_n$, $t_{n+1}$ such that $t_n \le t \le t_{n+1}$ using the pixel coverage representation 211. The processor 905 can then determine the pixel coverage value by linearly interpolating between the corresponding pixel coverage values $c_n$, $c_{n+1}$. The pixel coverage value at scale factor t for the pixel (x, y) 431 is determined by processor 905 using the formula:

$$c = \frac{t - t_n}{t_{n+1} - t_n} c_{n+1} + \frac{t_{n+1} - t}{t_{n+1} - t_n} c_n. \qquad (3)$$

Figure 5:
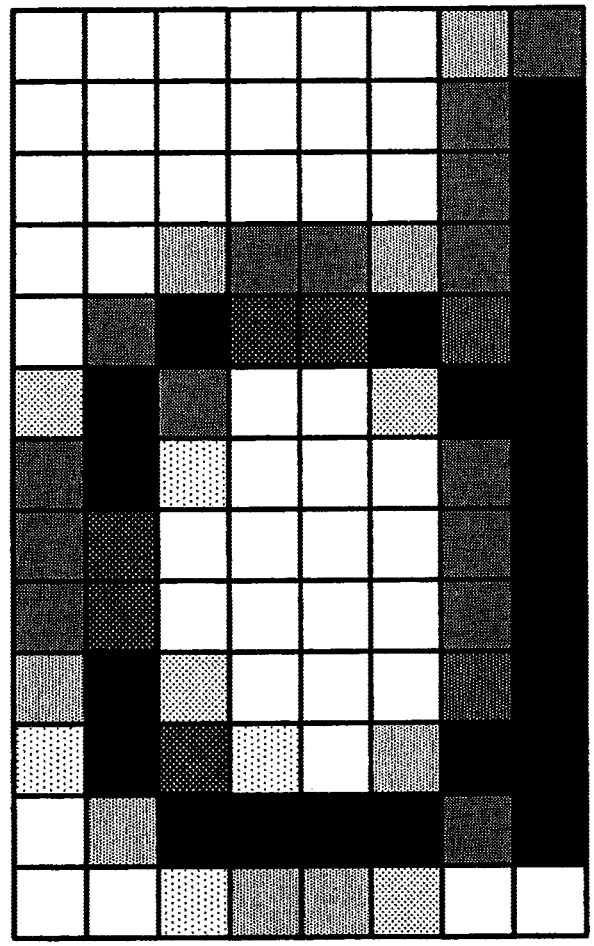
FIG. 5 is a diagram of an output multilevel bitmap, rendered according to the method of FIG. 4.

In step 440, the processor 905 writes the pixel coverage value 431 as determined by the step 430 to the corresponding pixel location in the output multilevel bitmap 402. The output multilevel bitmap 402 may be stored in the memory 906 or displayed on the display 914, or both. Finally, the processor 905 executes a decision 450 to determine if the multilevel bitmap is complete, or whether there are more pixel co-ordinates that require evaluation. If there are more pixel co-ordinates that require evaluation, the method 400 returns to step 410, otherwise, the method 400 continues to step 460 where the completed multilevel bitmap 402 is used to render pixels corresponding the bitmap 402 for display on the display device 914. Step 460 may also draw upon other graphical inputs, indicated at 465, necessary to complete the rendering process, including compositing operators and operands. However such operations and detail are not pertinent to the present disclosure. The method then ends at step 470. An example of the generated multilevel bitmap 402 is shown in FIG. 5.

Whilst the discussion so far has been concerned with representing and generating multilevel bitmaps for shapes in general, the methods disclosed herein are particularly useful for the representation and generation of multilevel bitmaps for glyphs in a font for display upon an electronic display device. It will be appreciated in this regard that a particular font, which is realized amongst a number of textual characters or symbols, will generally be characterized by certain glyphs that afford a specific appearance. For example the bulk of the text of this patent specification is reproduced in a font called Times New Roman 12 pt which includes glyphs characteristic of that font. Reproduction could alternatively or additionally occur in fonts such as Arial 12 pt, or Courier New 12 pt. Accordingly, each font will typically be characterized by a unique set of glyphs. The glyphs may be shared by a number of symbols within the font, with perhaps the same glyph being used multiple times in certain symbols of the font. A font symbol is a scalable graphical object. Further each glyph may be considered an atomic scalable graphical object. For example, FIGS. 6A-6D show two scalable graphical objects—the letters 'h' and 'n'—rendered on a display device. It can be readily seen that the base of the letter 'h' 610 and the letter 'n' 620 are identical by design in terms of the coverage values of the pixels used to display these portions of the objects. The pixels in the shaded regions are identical in the sense that their pixel coverage function values are equal for all scale factors t in the pre-determined range $[t_{min}, t_{max}]$. This redundancy can be used to reduce the memory required to store the pixel coverage functions in memory 906. As will be apparent from FIGS. 6A-6D, the glyph is scalable within a boundary of the pixel map according to the scaling factor such that a pixel location of an origin of the glyph within the pixel map remains constant for all scaling factors associated with the pixel map.

Figure 7:
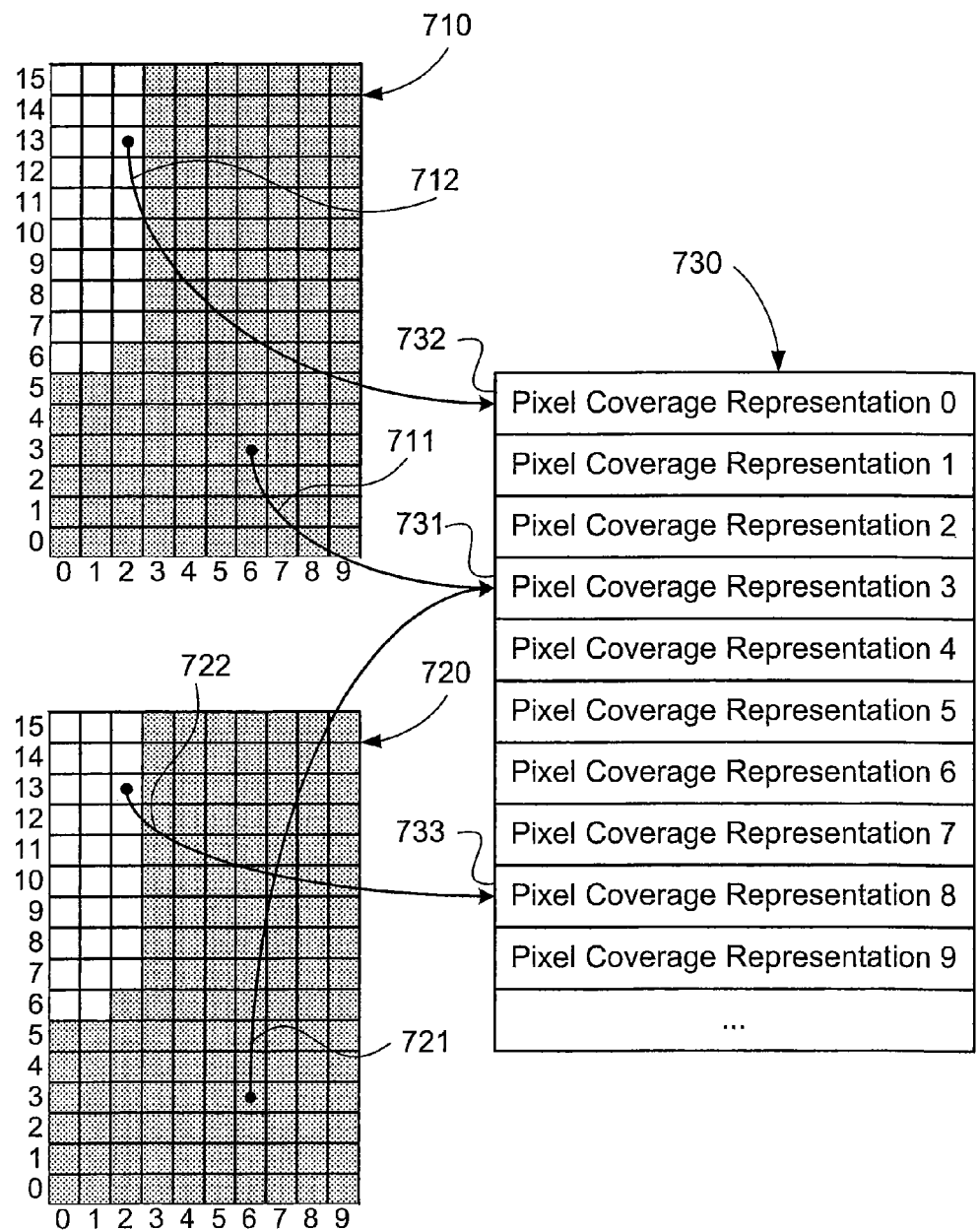
FIG. 7 is a diagram of a memory layout that illustrates the sharing of pixel coverage representations across multiple pixel maps, according to the example of FIG. 6.

FIG. 7 shows the relationship of the data structures, as previously described with reference to FIG. 2. In FIG. 7 there are two two-dimensional arrays of coverage representation references; one for the letter 'h' 710 and one for the letter 'n' 720. The references for pixel location (6, 3) (711 and 721 respectively) are shown. Since these two pixel coverage functions are equal for all values of t in the pre-determined range $[t_{min}, t_{max}]$, both references refer to the same pixel coverage representation 731. References for pixel (2, 13) (712 and 722 respectively), which is outside the shaded region, are also shown. Since the pixel coverage function for this pixel location is different for the letter 'h' and 'n', the references point to two different pixel coverage representations (732 and 733 respectively). The sharing of pixel coverage representations has the advantage that less memory 906 is required for the font, since fewer pixel coverage representations are required.

In a further implementation, the output multilevel bitmap can be rotated by 90, 180, or 270 degrees, horizontally flipped, vertically flipped, or any combination of those transformations by appropriately re-ordering the generated pixels.

Figure 8:
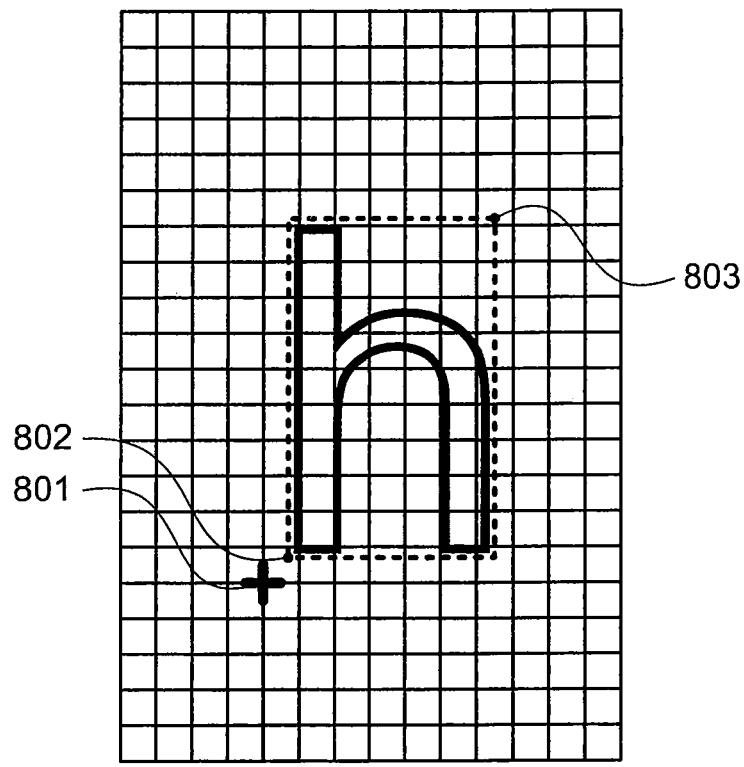
FIG. 8 is a diagram of a shape, which shows the fixed point of the scaling origin and an unscaled bounding box.

For optimization of the evaluation of pixel coverage functions evaluations, it will be appreciated that, at small scale factors, many pixel coverage functions near the boundary of the pixel map are zero. As such, those pixels near the boundary of the map can be determined by the processor 905 by storing in the memory 906 the fixed point of the scaling transformation and an unscaled bounding box of the shape. As shown in FIG. 8, the fixed point of the scaling transformation 801 is a point in pixel co-ordinates that corresponds to the origin of the shape. The unscaled bounding box of the shape consists of the lower-left bounding box co-ordinate $(x_{min}, y_{min})$ 802 and the upper-right bounding box co-ordinate $(x_{max}, y_{max})$ 803. The x-bounds of the scaled bounding box are $(\lfloor (1-t)x_0 + tx_{min} \rfloor, \lceil (1-t)y_0 + ty_{max} \rceil)$, and the y-bounds of the scaled bounding box are $(\lfloor (1-t)y_0 + ty_{min} \rfloor, \lceil (1-t)x_0 + tx_{max} \rceil)$, where $(x_0, y_0)$ is the fixed point of the scaling transformation, and t is the provided scaling factor. Those pixels outside the bounds of the scaled bounding box are zero, therefore the evaluation of the pixel coverage functions can be avoided to reduce processing time in the processor 905.

INDUSTRIAL APPLICABILITY

The arrangements described are applicable to the computer and data processing industries and particularly for the methods and systems for representing the shape of an object over a predetermined range of scaling factors using a plurality of pixel coverage functions.

The foregoing describes only some embodiments of the present invention, and modifications and/or changes can be made thereto without departing from the scope and spirit of the invention, the embodiments being illustrative and not restrictive.

I claim:

1. A method of generating an image of a scalable graphical object for reproduction on a display device, said method comprising the steps of:
   providing a pixel map and a scaling factor, the pixel map being a representation of at least of portion of the image having a plurality of pixels;
   storing a plurality of pixel coverage representations, each associated with at least one of the plurality of pixels and each defining a correspondence between a pixel coverage value for each pixel and the scaling factor, at least one of the plurality of pixel coverage representations being shared between a plurality of pixels in the pixel map;

for at least one pixel in the map:
receiving a scaling factor of the scalable graphical object;
identifying the pixel coverage representation associated with the pixel, and
determining a pixel coverage value for the pixel using the pixel coverage representation in accordance with the received scaling factor; and rendering the scalable graphical object using the determined pixel coverage value for the pixel on the display device.

2. A method according to claim 1, wherein said identifying is independent of the scaling factor.

3. A method according to claim 1, wherein the pixel map and the corresponding pixel coverage representations are associated with the scalable graphical object.

4. A method according to claim 3, wherein the scalable graphical object is a glyph.

5. A method according to claim 4, where the pixel coverage representations are shared between common regions of a plurality of glyphs.

6. A method of reproducing glyphs from a font on a display of an electronic device, said method being performed by a processor of the electronic device and comprising the steps of:
(a) providing a pixel map of each glyph, each pixel map having a plurality of pixels and a scaling factor, with each pixel of the pixel map corresponding to a pixel of the display;
(b) storing a plurality of pixel coverage representations, each associated with at least one of the pixels of a corresponding pixel map and each defining a correspondence between a pixel coverage value for each pixel and the scaling factor, at least one of the plurality of pixel coverage representations being shared between regions of the respective pixel map for the glyphs; and
(c) for at least one pixel in at least one of the pixel maps:
(ca) receiving a scaling factor of the scalable graphical object;
(cb) identifying the pixel coverage representation associated with the pixel, and
(cc) determining a pixel coverage value for the pixel using the pixel coverage representation in accordance with the received scaling factor; and
(cd) rendering the pixel of the glyph using the determined pixel coverage value for the pixel on the display device.

7. A method according to claim 6 wherein each of said glyphs is scalable within a boundary of the pixel map according to the scaling factor such that a pixel location of an origin of the glyph within the pixel map remains constant for all scaling factors associated with the pixel map.

8. A method according to claim 7, wherein steps (cc) and (cd) are not performed for a pixel of the map having a null pixel coverage representation.

9. A method according to claim 8, wherein said identifying is independent of the scaling factor and at least one of the pixel coverage representations is referenced by a plurality of pixel locations in the pixel map.

10. A computer readable storage medium having a computer program recorded thereon, the program being executable by computer apparatus to generate an image of a scalable graphical object for reproduction on a display device, said program comprising:

code for providing a pixel map and a scaling factor, the map being a representation of at least of portion of the image having a plurality of pixels with each pixel of the map corresponding to a pixel of the image;
code for storing to a memory a plurality of pixel coverage representations, each associated with at least one of the plurality of pixels and each defining a correspondence between a pixel coverage value for each pixel and the scaling factor, at least one of the plurality of pixel coverage representations being shared between a plurality of pixels in the pixel map;
code, executable, for at least one pixel in the map, to:
receive a scaling factor of the scalable graphical object;
identify the pixel coverage representation associated with the pixel, and
determine a pixel coverage value for the pixel using the pixel coverage representation in accordance with the received scaling factor; and
code for rendering the scalable graphical object using the determined pixel coverage value for the pixel on the display device.

11. A computer readable storage medium having a computer program recorded thereon, the program being executable by an electronic device to reproduce glyphs from a font on a display of the electronic device, said program comprising:
code for providing a pixel map of each glyph, each pixel map having a plurality of pixels and a scaling factor, with each pixel of the pixel map corresponding to a pixel of the display;
code for storing a plurality of pixel coverage representations, each associated with at least one of the pixels of the corresponding pixel map and each defining a correspondence between a pixel coverage value for each pixel and the scaling factor, at least one of the plurality of pixel coverage representations being shared between regions of the respective pixel map for the glyphs; and
code, for at least one pixel in at least one of the maps, to:
receive a scaling factor of the scalable graphical object;
identify the pixel coverage representation associated with the pixel, and
determine a pixel coverage value for the pixel using the pixel coverage representation in accordance with the received scaling factor; and
render the pixel of the glyph using the determined pixel coverage value for the pixel on the display.

12. Computer apparatus comprising:
a display device;
a storage medium having a computer program recorded thereon;
a processor coupled to the storage medium and to the display and arranged to execute the program to generate an image of a scalable graphical object for reproduction on the display device;
said program comprising:
code for providing a pixel map and a scaling factor, the map being a representation of at least of portion of the image having a plurality of pixels with each pixel of the map corresponding to a pixel of the image;
code for storing a plurality of pixel coverage representations, each associated with at least one of the pixels and each defining a correspondence between a pixel coverage value for each pixel and the scaling factor, at least one of the plurality of pixel coverage representations being shared between a plurality of pixels in the pixel map;

code, executable, for at least one pixel in the map, to:
  receive a scaling factor of the scalable graphical object;
  identify the pixel coverage representation associated with the pixel, and
  determine a pixel coverage value for the pixel using the pixel coverage representation in accordance with the received scaling factor; and
code for rendering the scalable graphical object using the determined pixel coverage value for the pixel on the display device.

13. A portable electronic device comprising:

a display;

a computer readable storage medium having a computer program recorded thereon; and a processor coupled to the storage medium and to the display and arranged to execute the program to reproduce glyphs from a font on the display, the program comprising:

code for providing a pixel map of each glyph, each pixel map having a plurality of pixels and a scaling factor, with each pixel of the pixel map corresponding to a pixel of the display;

code for storing a plurality of pixel coverage representations, each associated with at least one of the pixels of a corresponding pixel map and each defining a correspondence between a pixel coverage value for each pixel and the scaling factor, at least one of the plurality of pixel coverage representations being shared between regions of the respective pixel map for the glyphs; and code, for at least one pixel in at least one of the maps, to:
  receive a scaling factor of the scalable graphical object;
  identify the pixel coverage representation associated with the pixel, and
  determine a pixel coverage value for said pixel using the pixel coverage representation in accordance with the received scaling factor; and
  render the pixel of the glyph using the determined pixel coverage value for the pixel on the display.

\* \* \* \* \*